United States Patent [19]

Ellgen

[11] Patent Number: 5,597,664
[45] Date of Patent: Jan. 28, 1997

[54] LITHIUM MANGANESE OXIDE COMPOUND AND METHOD OF PREPARATION

[75] Inventor: Paul C. Ellgen, Oklahoma City, Okla.

[73] Assignee: Kerr-McGee Corporation, Oklahoma City, Okla.

[21] Appl. No.: 524,599

[22] Filed: Sep. 7, 1995

[51] Int. Cl.$^6$ ........................................................ H01M 4/50
[52] U.S. Cl. .......................... 429/224; 423/49; 423/50; 423/51; 423/52; 423/179.5; 423/183; 423/599; 423/605
[58] Field of Search ............... 429/224; 423/49, 423/50, 51, 52, 179.5, 183, 599, 605

[56] References Cited

U.S. PATENT DOCUMENTS

| | | | |
|---|---|---|---|
| 5,196,279 | 3/1993 | Tarascon | 429/194 |
| 5,240,794 | 8/1993 | Thackeray et al. | 429/224 |
| 5,266,299 | 11/1993 | Tarascon | 423/599 |

*Primary Examiner*—Stephen Kalafut
*Assistant Examiner*—Richard H. Lilley, Jr.
*Attorney, Agent, or Firm*—Herbert M. Hanegan; J. Rodgers Lunsford, III

[57] ABSTRACT

A method for manufacturing $Li_2Mn_2O_4$ which comprises the steps of providing $LiMn_2O_4$; providing a lithium salt; forming a solution or suspension of the $LiMn_2O_4$ and lithium salt in a liquid medium; and adding a reducing agent to the solution or suspension.

16 Claims, No Drawings

LITHIUM MANGANESE OXIDE COMPOUND AND METHOD OF PREPARATION

FIELD OF THE INVENTION

The present invention relates to a lithium manganese oxide compound and its production by contacting $LiMn_2O_4$ and a lithium salt in a solution or suspended in a liquid medium with a reducing agent other than lithium metal.

BACKGROUND OF THE INVENTION

The present invention relates to lithiated manganese oxides, to methods of making such materials and to the use of such materials in the manufacture of the cathodes of electrochemical cells.

More particularly it relates to a process for the manufacture of $Li_2Mn_2O_4$ and the use of $Li_2Mn_2O_4$ in electrical storage batteries. Still more particularly, it relates to a process for the manufacture of $Li_2Mn_2O_4$ by the reaction of $LiMn_2O_4$ with lithium and to using $Li_2Mn_2O_4$ in the manufacturing of the cathode component of rechargeable lithium-ion electrical storage batteries.

Conventionally used nonaqueous electrolyte cells are primary cells which can be used only once. With recent widespread use of video cameras and small sized audio instruments, there has been an increased need for secondary cells which can be used conveniently and economically for long, repeated use.

Lithium cells useful as electrical storage batteries incorporate a metallic lithium anode and a cathode including an active material which can take up lithium ions. An electrolyte incorporating lithium ions is disposed in contact with the anode and the cathode. During discharge of the cell, lithium ions leave the anode, enter the electrolyte and are taken up in the active material of the cathode, resulting in release of electrical energy. Provided that the reaction between the lithium ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as secondary cells.

It has long been known that useful cells can be made with a lithium metal anode and a cathode material which is a sulfide or oxide of a transition metal, i.e., a metal capable of assuming plural different valence states. Dampier, "The Cathodic Behavior of CuS, $MoO_3$, and $MnO_2$ in Lithium Cells," J. Electrochem. Soc., Vol. 121, No. 5, pp. 656–660 (1974) teaches that a cell incorporating a lithium anode and manganese dioxide cathode-active material can be used as an electrical power source. The same reference further teaches that a lithium and manganese dioxide cell can serve as a secondary battery.

There has been considerable effort in the battery field directed towards development of cathode-active materials based on lithium manganese oxides. Both lithium and manganese dioxide are relatively inexpensive, readily obtainable materials, offering the promise of useful, potent battery at low cost. Nonaqueous electrolyte primary cells using lithium as a negative electrode-active material and nonaqueous solvent such as an organic solvent as an electrolyte have advantages in that self-discharge is low, nominal potential is high and storability is excellent. Typical examples of such nonaqueous electrolyte cells include lithium manganese dioxide primary cells which are widely used as current sources for clocks and memory backup of electronic instruments because of the long-term reliability.

Secondary lithium batteries using an intercalation compound as cathode and free lithium metal as anode have been studied intensively due to their potential technological significance. Unfortunately, these studies have revealed that inherent dangers associated with the use of free lithium preclude the commercial viability of such batteries. Upon repeated cycling, dendritic growth of lithium occurs at the lithium electrode. Growth of lithium dendrites can lead eventually to an internal short-circuit in the cell with a subsequent hazardous uncontrolled release of the cell's stored energy.

One approach to improving the reversibility of lithium-based anodes involves the use of lithium intercalation compounds. The intercalation compound serves as a host structure for lithium ions which are either stored or released depending on the polarity of an externally applied potential. During discharge the electromotive force reverses the forced intercalation thereby producing current.

Batteries using the approach, in which an intercalation compound is used as the anode instead of free lithium metal, are known in the art as "lithium-ion" or "rocking-chair" batteries. Utilization of $Li_2Mn_2O_4$ in lithium-ion secondary batteries is described in detail in the recent review paper, "The $Li_{1+x}Mn_2O_4$/C Rocking-chair System," J. M. Tarascon and D. Guyomard, *Electrochimica Acta*, Vol. 38, No. 9, pp. 1221–1231 (1993).

In this approach, a nonaqueous secondary cell is provided with (a) a negative electrode consisting essentially of a carbonaceous material as a carrier for a negative electrode active material, said carrier being capable of being doped and dedoped with lithium and (b) a positive electrode comprising lithium manganese complex oxide as an essential positive electrode-active material. This cell has a high expected applicability because dendrite precipitation of lithium does not occur on the surface of the negative electrode, the pulverization of lithium is inhibited, the discharge characteristics are good and the energy density is high.

The output voltage of this lithium-ion battery is defined by the difference in chemical potential of the two insertion compounds. Accordingly, the cathode and anode must comprise intercalation compounds that can intercalate lithium at high and low voltages, respectively.

The viability of this concept has been demonstrated and future commercialization of such cells in D, AA or coin-type batteries has been indicated. These cells include a $LiMn_2O_4$, a $LiCoO_2$, or a $LiNiO_2$ cathode, an electrolyte and a carbon anode. These lithiumion batteries are described as being superior to nickel-cadmium cells and do not require a stringent environment for fabrication since the lithium based cathode employed is stable in an ambient atmosphere, and the anode is not free metal, but an intercalation compound used in its discharged state (without intercalated lithium) that is stable in ambient atmosphere when the cells are assembled.

However, a nonaqueous electrolyte secondary cell such as described above has disadvantages in that the cell capacity has proven to decrease because some of the lithium doped into the carbonaceous material used as a negative electrode active material cannot be dedoped upon discharge. In practice, either carbon or graphite irreversibly consumes a portion of the lithium during the first charge-discharge cycle. As a result the capacity of the electrochemical cell is decreased in proportion to the lithium that is irreversibly intercalated into the carbon during the first charge.

This disadvantage can be eliminated by using $Li_2Mn_2O_4$ as all or part of the cathode. Upon the first charge of the cell so manufactured, the $Li_2Mn_2O_4$ is converted to $\lambda\text{-}Mn_2O_4$. When the cell is operated over the appropriate range of electrical potential, subsequent discharge cycles of the cell convert $\lambda\text{-}Mn_2O_4$ to $LiMn_2O_4$, and charge cycles convert $LiMn_2O_4$ to $\lambda\text{-}Mn_2O_4$. Because excess lithium is available to satisfy the irreversible consumption by carbon or graphite, cells manufactured using $Li_2Mn_2O_4$ have greater electrical capacity.

The capacity of a lithium ion cell is also limited by the quantity of lithium which can be reversibly removed (i.e., cycled) from the cathode. In the cathode materials of the prior art, only about one half mole of lithium per transition metal can be removed reversibly. Thus, they have limited specific capacity, generally no more than about 140 mAh/g.

In principle, one mole of lithium per mole of manganese can be removed reversibly from $Li_2Mn_2O_4$ In practice, however, cells that cycle between $Li_2Mn_2O_4$ and $LiMn_2O_4$ suffer more rapid loss of electrical capacity than cells that cycle between $LiMn_2O_4$ and $\lambda\text{-}Mn_2O_4$. Moreover, cells that cycle between $LiMn_2O_4$ and $\lambda\text{-}Mn_2O_4$ deliver most of their electrical energy between about 4 volts and about 3 volts, whereas, cells that cycle between $Li_2Mn_2O_4$ and $LiMn_2O_4$ deliver most of their electrical energy between about 3 volts and about 2 volts.

Thus, a combination of factors gives a lithium-ion cell that cycles lithium between a carbon or graphite matrix as the anode and $LiMn_2O_4$ as the fully discharged cathode many particularly attractive features. Such cells can be assembled conveniently in an over-discharged state using carbon or graphite for the anode and $Li_2Mn_2O_4$ for the cathode. Because the second lithium ion cannot be used effectively for repeated cycling, its consumption to satisfy the irreversible lithium intercalation of the carbonaceous anode material does not entail any additional loss of electrical capacity.

The compounds $LiMn_2O_4$ and $Li_2Mn_2O_4$ that are useful in this application are known in the art. Depending upon methods of preparation, their stoichiometries can differ slightly from the ideal. They are precisely identified however by their x-ray powder diffraction patterns. The materials herein referred to as $LiMn_2O_4$ and $Li_2Mn_2O_4$ have the diffraction spectra given on cards 35-781 and 38-299, respectively, of the Powder Diffraction File published by the International Centre for Diffraction Dam, Newtown Square Corporate Campus, 12 Campus Boulevard, Downtown Square, Pa., 19073-3273, U.S.A.

$LiMn_2O_4$ can be prepared from a wide range of lithium sources and a wide range of manganese sources under a wide range of conditions. U.S. Pat. No. 5,135,732 discloses a method for the low temperature preparation of $LiMn_2O_4$. $LiMn_2O_4$ is one of the raw materials of the present invention.

In contrast, $Li_2Mn_2O_4$ is more difficult to prepare and in fact, known methods for the preparation of $Li_2Mn_2O_4$ are excessively costly. These methods include the electrochemical intercalation of lithium into $LiMn_2O_4$ (W. Li, W. R. McKinnon, and J. R. Dahn, *J. Electrochem. Soc.*, Vol. 141, No. 9, pp. 2310–2316), the reaction of $LiMn_2O_4$ with lithium iodide (U.S. Pat. No. 5,266,299), and the reaction of $LiMn_2O_4$ with butyl lithium (M. M. Thackeray, W. I. F. David, P. G. Bruce, J. B. Goodenough, *Mat. Res. Bull.*, Vol. 18, pp. 461–472 (1983)).

U.S. Pat. No. 5,196,279 teaches the synthesis of $Li_{1+x}Mn_2O_4$ from LiI and either $LiMn_2O_4$ or $\lambda\text{-}MnO_2$. The reaction is effected by heating mixtures of the solid reactants to 150° C. in sealed ampoules. $Li_{1+x}Mn_2O_4$ is a mixture of $Li_2Mn_2O_4$ and $LiMn_2O_4$.

U.S. Pat. No. 5,240,794 discloses a variety of lithium and lithium-ion batteries. These include a range of lithium manganese oxide compositions, including the composition $Li_{1+x}Mn_2O_4$. The patent discloses preparative methods for this composition generally involving mixing precursor lithium compounds and manganese compounds. The mixtures are then heated at elevated temperatures (typically 300° C.) in a reducing atmosphere (typically hydrogen gas) for several hours (typically 24 hours).

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a lithium manganese oxide as an essential positive electrode active material.

In accordance with the present invention, the above object can be accomplished by $Li_2Mn_2O_4$ prepared by contacting $LiMn_2O_4$ and a lithium salt in solution or suspended in a liquid medium with a reducing agent other than lithium metal.

DESCRIPTION OF THE PREFERRED EMBODIMENT

As noted above, this invention is directed to a method of manufacturing $Li_2Mn_2O_4$. Specifically such method is accomplished by providing $LiMn_2O_4$, providing a lithium salt, forming a solution or suspension of the $LiMn_2O_4$ and lithium salt in a liquid medium, and adding a reducing agent soluble in the liquid medium to the solution or suspension.

Advantageously the reaction of the present invention between the reducing agent and the solution or suspension of $LiMn_2O_4$ and lithium salt is carried out at a temperature of less than about 100° C. at ambient pressure. Preferably the reaction is carried out at a temperature of from about 20° C. to about 80° C. at a pressure of less than about 45 psi.

Advantageously the lithium salt of the present invention is selected from the group consisting of LiOH and $Li_2CO_3$. The preferred lithium salt is LiOH. The method of this invention may also be practiced wherein the lithium salt is an aqueous form prior to the solution or suspension with $LiMn_2O_4$ being formed.

Advantageously the reducing agent of the present invention is selected from the group consisting of hydrazine, hydrazine sulfate, hydroxylamine hydrochloride, lithium borohydride and lithium, ammonium and hydrogen sulfides. The most preferred reducing agent is hydrazine. The method of the present invention can also be practiced wherein the reducing agent is in an aqueous form prior to adding to the solution or suspension.

The liquid medium of the present invention advantageously is selected from the group consisting of water and alkyl alcohols. The liquid medium most preferred is water.

The reaction between the reducing agent and the solution or suspension of $LiMn_2O_4$ and lithium salt is advantageously carried out under basic conditions. If the liquid medium is essentially aqueous, the pH is advantageously greater than about 7. Preferably the reaction takes less than about 240 minutes to complete. Most preferably the reaction takes from about 5 minutes to about 60 minutes to complete.

As discussed above, the use for which the $Li_2Mn_2O_4$ prepared by the method of this invention is uniquely applicable is as a cathode for use in a secondary lithium ion electrochemical cell. Such a cell may be of known design having a lithium intercalation anode, a suitable nonaqueous electrolyte, a cathode of material made by the method of this invention, and a separator between the anode and the cathode. The anode may be of known materials such as transition metal oxides, transition metal sulfides and carbonaceous materials. The nonaqueous electrolyte can be in the form of a liquid, a gel or a solid matrix that contains mobile lithium ions.

Analysis of the products of this invention relies heavily on X-ray diffraction characterization. X-ray diffraction characterizes crystalline phases. It provides very reliable identifications of the compounds present in a sample, but it may not be a good quantitative-analysis method; poorly crystalline compounds or compounds which are present in small amounts (i.e., a few percent) may not be detected. Thus, undetected impurities, including $LiMn_2O_4$, could be present at low levels in the $Li_2Mn_2O_4$ so produced. However, it is also true that the chemical characteristics of $Li_2Mn_2O_4$ and the conditions of the X-ray diffraction measurement interact in a way which exaggerates the estimated amount of $LiMn_2O_4$ starting material left in the $Li_2Mn_2O_4$ product. If a $Li_2Mn_2O_4$ sample is exposed to laboratory air for several minutes in the course of making a diffraction measurement $Li_2Mn_2O_4$ reacts with oxygen and water from the air to produce $LiMn_2O_4$ and LiOH as set forth in the following equation:

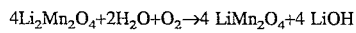
$$4Li_2Mn_2O_4 + 2H_2O + O_2 \rightarrow 4 LiMn_2O_4 + 4 LiOH$$

Successive X-ray spectra taken on the same sample show that the amount of $LiMn_2O_4$ present in the sample increases as the duration of its exposure to the atmosphere increases. Because the reaction requires that atoms diffuse between the surface of an individual particle and its interior, the reaction probably produces a growing shell of $LiMn_2O_4$ that surrounds a shrinking core of $Li_2Mn_2O_4$. Because the length of the diffusion path increases as the extent of reaction increases, the reaction is fast for pure $Li_2Mn_2O_4$ and much slower for partially converted $Li_2Mn_2O_4$ whose surface is already covered with $LiMn_2O_4$.

X-ray diffraction spectra of the $Li_2Mn_2O_4$ Of this invention typically show some evidence for the presence of $LiMn_2O_4$. Computer reconstruction of the observed spectra from computer-stored spectra of the pure compounds gives somewhat subjective estimates of the relative heights of peaks attributable to each of the two compounds. These estimates are calculated from the estimated intensity of the principle peak of each compound. For well-protected products of seemingly clean reactions, this procedure typically gives purities in the range of 90–95%. These estimates appear to be conservative.

For materials synthesized toward the end of this experimental program, sample plaques were prepared inside an inert-atmosphere box. A hydrocarbon oil (3-in-1 Household Oil™) was mixed with the sample before the plaque was pressed. This procedure afforded excellent protection. When sample plaques are prepared in this way $LiMn_2O_4$ peaks do not increase in intensity during the time required to collect replicate spectra.

Taken as a whole, the available information indicates that the reduction of $LiMn_2O_4$ in the presence of suitable lithium salts goes stoichiometrically to completion, except insofar as side-reactions limit the amounts of lithium ion or reducing agent that are available to participate in the reaction with $LiMn_2O_4$.

EXAMPLE 1

Example 1 demonstrated that an aqueous suspension of $LiMn_2O_4$ reacts with lithium hydroxide and hydrazine to produce $Li_2Mn_2O_4$.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiMn_2O_4$ (74.41 g, 412 mmoles), $LiOH.H_2O$ (17.27 g, 412 mmoles), and deionized water (150 ml) were charged to the flask. Stirring was begun. When the LiOH had dissolved, a volumetric pipet was used to add $N_2H_4.H_2O$ (5.0 ml, 5.15 g, 103 mmoles) to the suspension. Except for brief periods, a counterflow of argon was maintained during these additions. Reaction began immediately. Gas was evolved, and the suspension foamed. Within a few minutes the color of the suspension changed from black to brown. Sufficient heat was evolved by the reaction to increase the temperature of the suspension to about 60° C.

When gas evolution ceased, the solid product was recovered by filtration in a Schlenk filter tube under an atmosphere of argon. The superficially dry filter cake was washed on the frit with a small amount of deionized water. After the wash water was removed by filtration, an oil-pump vacuum and intermittent heating with a hot-air gun were used to remove residual water. A small portion of the solid product was removed for analysis by X-ray diffraction. As judged by the relative heights of the principal peaks, the recovered solids were about 85% $Li_2Mn_2O_4$ and about 15% unreacted $LiMn_2O_4$.

EXAMPLE 2

Example 2 closely replicated Example 1.

As described for Example 1, $LiMn_2O_4$ (74.41 g, 412 millimoles), $LiOH.H_2O$ (17.29 g, 412 mmoles), deionized water (150 ml), and $N_2H_4.H_2O$ (5.0 ml, 5.15 g, 103 mmoles) were combined. The suspension turned yellow-brown within about three minutes. Gas evolution was nearly complete in about 5 minutes. The autothermal temperature increase reached 55° C. The suspension was stirred for an additional 60 minutes and then filtered in a Schlenk filter tube under an atmosphere of argon.

The superficially dry filter cake was washed on the frit with 50 ml of deionized water that had been deoxygenated by purging with argon. The wash water was removed by filtration. The product was dried in the Schlenk filter tube; the tube was evacuated with an oil pump and heated with several turns of electric heating tape. Thereafter, the Schlenk filter tube was taken into a dry box, where a small amount of the product was removed for analysis by X-ray diffraction. As judged by the relative heights of the principal peaks, the recovered solids were about 85% $Li_2Mn_2O_4$ and about 15% unreacted $LiMn_2O_4$.

EXAMPLE 3

Example 3 demonstrated the preparation of a 1 kg batch of $Li_2Mn_2O_4$ by scale-up of the synthesis procedure of Examples 1 and 2.

Apparatus to carry out the reaction and to filter and dry the product was mounted on a free-standing support. A three-liter, three-neck, round-bottom flask served as the reaction vessel. A glass tube with a large-bore stopcock was centered in the bottom of the flask. The flask was equipped with an overhead stirrer, reflux condenser, thermometer, argon-inlet port, and a pressure-equalizing dropping funnel. The flask was vented to the atmosphere through a mineral oil-filled check valve. A large filter funnel with a sintered-glass frit was provided for product recovery. The top of the filter was covered with a loosely fitted cap fabricated from stainless steel. The cap was attached rigidly to the frame. The cap contained a hole through which the glass tube in the bottom of the reaction vessel could be directed into the filter. Two metal tubes through the cap provided means to purge the interior of the filter with argon. A lip on the cap provided for a loose seal to a drying oven that could be raised to enclose the filter and dry the filter cake in situ. A thermocouple was inserted through a fitting in the cap so that the oven temperature could be monitored. The drying oven was fabricated from a large metal can; it was wrapped with a few turns of heating tape and then with glass cloth for insulation.

The assembled apparatus was purged with argon. $LiMn_2O_4$ (997.8 g, 5.52 moles) and $LiOH.H_2O$ (231.6 g, 5.52 moles) were charged to the reaction flask. Deionized water (1700 ml) was deoxygenated by argon sparging and charged to the reaction flask. Stirring was begun. Hydrazine monohydrate ($N_2H_4.H_2O$, 69.07 g, 1.38 moles) was charged to the dropping funnel and added dropwise to the reaction vessel. Gas evolution was accompanied by foaming and an autothermal temperature increase. To control the foaming and limit the maximum temperature to about 55° C., it was necessary to limit the rate of hydrazine addition. About three hours were required to add it all. The color of the suspension was discernibly lighter after about one-third of the hydrazine had been added. When hydrazine addition was complete, the suspension was yellow-brown.

Through the stopcock, the product suspension was dropped from the reaction vessel into the filter. The solids were recovered on the filter using a 3-liter filter flask and the house vacuum. A vigorous purge of argon was maintained over the suspension throughout the filtration. Filtration was rapid. The resulting cake was not washed. When filtration was complete, the vacuum flask was removed. The drying oven was raised around the filter and sealed loosely to the stainless steel cap. An argon purge of the oven interior was begun.

Power was applied to the heating tape, and the temperature inside the oven was monitored. The oven temperature reached 100° C. in about an hour; over the next 4 hours, it increased to about 170° C. Thereafter, heating was discontinued, and the apparatus was allowed to cool, still under flowing argon. When cool enough to handle, the oven was removed. Some condensate formed on the wall of the filter, indicating that drying was incomplete. The filter was removed from the frame, and the cake was broken up with a spatula in air; it was dry enough to crumble easily. Thereafter, the filter was taken into a dry box, where the product was transferred to a pyrex bottle with a screw cap. During this handling, the product was exposed to air for about 15 minutes. No decomposition was visually apparent. Subsequently, the pyrex bottle was transferred to a vacuum oven; the product was further dried at 150° C. in a nitrogen atmosphere and then under vacuum at 150° C. for 14 hours. The product was cooled to about 50° C. in a nitrogen atmosphere.

A small portion was removed for analysis by X-ray diffraction. As judged by the relative heights of the principal peaks, the recovered solids were about 90% $Li_2Mn_2O_4$ and about 10% unreacted $LiMn_2O_4$.

EXAMPLE 4

Example 4 tested refinements of the apparatus of Example 3. A 1 kg batch of $Li_2Mn_2O_4$ was prepared using these improvements.

Example 4 was similar to Example 3. To improve the rate of drying and more effectively protect the product from exposure to air, minor improvements to the apparatus were made. The principal changes were to the oven. It was shortened, rewired, and reinsulated. A hole was drilled in its bottom so that the stem of the filter protruded when the apparatus was assembled. A one-hole rubber stopper was pressed into the stem of the funnel, and one arm of a three-way stopcock was inserted into the stopper. During the filtration step, vacuum was applied through the second arm of the three-way stopcock. During the drying step, an upward flow of argon was directed through the filter cake through the third arm of the three-way stopcock. After drying was complete, this flow was continued while the filter was removed, covered with film, and taken into the dry box. This provided substantially better protection for the product during the last stages of the recovery process.

$LiMn_2O_4$ (1020.0 g, 5.64 moles) and $LiOH.H_2O$ (236.7 g, 5.64 moles) were charged to the reaction flask. Deionized water (1200 ml) was deoxygenated by argon sparging and charged to the reaction flask. Stirring was begun. Hydrazine monohydrate ($N_2H_4.H_2O$, 70.6 g, 1.41 moles) was charged to the dropping funnel and added dropwise to the reaction vessel. By cooling the suspension with a water-cooled finger inserted through one neck of the reaction flask, it was possible to add the hydrazine in about two hours while keeping the maximum temperature below 40° C. Filtration, recovery of the filter cake, and subsequent drying were effected as in Example 3, except for the improvements described above.

A small portion was removed for analysis by X-ray diffraction. As judged by the relative heights of the principal peaks, the recovered solids were about 90% $Li_2Mn_2O_4$ and about 10% unreacted $LiMn_2O_4$.

EXAMPLE 5

Example 5 demonstrated that $Li_2Mn_2O_4$ was readily synthesized from $LiMn_2O_4$, lithium hydroxide, and hydrazine monohydrate with methanol as the liquid medium.

In apparatus similar to that used in Example 1, $LiMn_2O_4$ (74.41 g, 412 millimoles) and $LiOH.H_2O$ (17.29 g, 412 mmoles) were covered with methanol (130 ml). $N_2H_4.H_2O$ (5.0 ml, 5.15 g, 103 mmoles) was diluted with methanol (30 ml) in a dropping funnel and added dropwise over about 15 minutes. A cold-water bath was used to keep the temperature below 35° C. About 20 minutes after addition was complete, very slow gas evolution continued; after 60 minutes it had ceased. The product was yellow-brown.

The solid product was recovered by filtration in a Schlenk filter tube under an atmosphere of argon. Methanol remaining in the superficially dry filter cake was removed by heating the filter tube with several turns of heating tape while evacuating to an oil-pump vacuum. Thereafter, the product was transferred into a glass jar in a dry box. A small portion was removed for analysis by X-ray diffraction. As judged by the relative heights of the principal peaks, the recovered solids were about 90% $Li_2Mn_2O_4$ and about 10% unreacted $LiMn_2O_4$.

EXAMPLE 6

Example 6 demonstrated that hydrazine sulfate was ineffective for the reduction of $LiMn_2O_4$ in the presence of LiOH when the liquid medium was dimethoxyethane. $Li_2Mn_2O_4$ was formed when pyridine was added to the mixture.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiOH.H_2O$ (4.20 g, 100 mmoles) was charged to the flask and covered with 1,2-dimethoxyethane (150 ml). Stirring was begun. Essentially no LiOH dissolved. $LiMn_2O_4$ (9.10 g, 50 millimoles) and $N_2H_4.H_2SO_4$ (4.06 g, 31 mmoles) were added. Except for brief periods, a counterflow of argon was maintained during these additions. With heat from an electric mantle, the mixture was refluxed (85° C.) for an hour. There was no evidence of reaction.

The mixture was cooled to room temperature and about 22 ml of pyridine was added. Heating and stirring were resumed. Within about 2 hours, the suspension became red-brown. The solid product was recovered by filtration in a Schlenk filter tube under an atmosphere of argon. The superficially dry filter cake was washed on the frit with 50 ml of tetrahydrofuran. The cake was transferred to a glass jar and dried in a nitrogen-purged oven at 180° C. for two hours. A small portion was removed for analysis by X-ray diffraction, which showed the product to contain $Li_2Mn_2O_4$ with several impurities, including unreacted $LiMn_2O_4$, LiOH, $Mn_2O_3$, and at least one unidentified compound.

EXAMPLE 7

Example 7 demonstrated that hydrazine sulfate was poorly effective for the reduction of $LiMn_2O_4$ in the presence of LiOH and in a liquid medium that was a mixture of dimethoxyethane and pyridine.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiMn_2O_4$ (50.0 g), $N_2H_4.H_2SO_4$ (5.60 g), and $LiOH.H_2O$ (14.5 g) were charged to the flask and covered with 1,2-dimethoxyethane (140 ml) and pyridine (30 ml). Stirring was begun and the mixture was heated to reflux. Over the following three hours, additional $LiOH.H_2O$ (2.90 g) and pyridine (50 ml) were added. Additional $N_2H_4.H_2O$ (21.4 g) was added in three increments. Thus, total reactants charged were $LiMn_2O_4$ (50.0 g, 277 millimoles), $N_2H_4.H_2SO_4$ (27.0 g, 207 mmoles), and $LiOH.H_2O$ (17.4 g, 415 mmoles). Except for brief periods, a counterflow of argon was maintained during these additions.

After about 4 hours, the reaction mixture was red-brown. It was cooled; the solids were recovered by filtration on a sintered glass frit under a blanket of argon, transferred to a glass jar, and dried in a nitrogen-purged oven at 170° C. for about 24 hours. A small portion was removed for analysis by X-ray diffraction, which showed the product to contain $Li_2Mn_2O_4$ with several impurities, including unreacted $LiMn_2O_4$, LiOH, $Mn_2O_3$, $Li_2SO_4.H_2O$, and at least one unidentified compound.

EXAMPLE 8

Example 8 demonstrated that hydrazine sulfate was less effective than hydrazine for the aqueous reduction of $LiMn_2O_4$ in the presence of LiOH at an elevated temperature.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiMn_2O_4$ (50.0 g, 277 mmole), $N_2H_4.H_2SO_4$ (27.0 g, 207 mmole), and $LiOH.H_2O$ (17.4 g, 415 mmole), and $H_2O$ (100 ml) were charged to the flask and stirring was begun. No reaction was evident at ambient temperature. Pyridine (100 ml) was then added; no reaction was evident. Thereafter, heat was applied from an electric heating mantle. When temperature reached 90° C., vigorous reaction began, and the suspended solids became red-brown within about 15 minutes.

The mixture was cooled and the liquid was decanted. The solids were washed into a flitted funnel using a total of about 200 ml of deionized water. The funnel was protected with a blanket of argon. The superficially dry solids were transferred in air to a glass jar. These measures to exclude oxygen were inadequate; the exposed surface blackened rapidly. Nevertheless, the product was placed in a nitrogen-purged oven and dried at about 170° C. for about 24 hours. A small portion was removed for analysis by X-ray diffraction, which showed the product to contain approximately equal portions of $Li_2Mn_2O_4$ and $LiMn_2O_4$, together with a somewhat smaller amount of $Mn_2O_3$.

EXAMPLE 9

Example 9 demonstrated that $[NH_3OH]Cl$ was somewhat effective for the aqueous reduction of $LiMn_2O_4$ in the presence of LiOH at ambient temperature.

A 500 ml three-neck round-bottom flask was mounted on a ring stand in a hood. It was fitted with an overhead stirrer, a thermometer, a reflux condenser, a pressure-equalizing dropping funnel, and an argon inlet. The assembled apparatus was purged with argon, which was vented to the atmosphere through a mineral-oil filled check valve. $LiMn_2O_4$ (50.0 g, 277 mmole), $LiOH.H_2O$ (23.2 g, 553 mmole), and $H_2O$ (150 ml) were charged to the flask and stirring was begun. Hydroxylamine hydrochloride, $[NH_3OH]Cl$ (19.22 g, 277 mmole), was dissolved in about 100 ml $H_2O$ and charged to the dropping funnel.

Thereafter, the hydroxylamine solution was added to the reaction flask dropwise over about 30 minutes. Gas was evolved. The evolved gas was colorless in the reaction vessel; however, when it collected in an Erlenmeyer flask and contacted air, it turned red-brown. (A short length of tubing ran from the exit port of the check valve into the Erlenmeyer flask, so that any oil carried over from the check valve would be contained.) These observations implied that the evolved gas was nitric oxide, NO, which is colorless, but which reacts with oxygen to form red-brown NO2. Thus, at least in part, the reaction may be

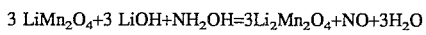

rather than

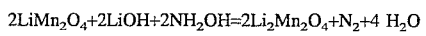

When hydroxylamine addition was complete, the suspension was light yellow-brown. The solid product was recovered by filtration in a Schlenk filter tube under an atmosphere of argon. The product was dried in the Schlenk filter tube; the tube was evacuated with an oil pump and heated with several turns of electric heating tape. The Schlenk filter tube was taken into a dry box. A small portion was removed for analysis by X-ray diffraction, which showed the product to contain $Li_2Mn_2O_4$, a substantial amount of unreacted $LiMn_2O_4$, and smaller amounts of $Mn(OH)_2$ and $Mn_2O_3$.

EXAMPLE 10

Example 10 demonstrated that $Li_2CO_3$ was less effective than LiOH as a source of lithium ion in the aqueous reduction of $LiMn_2O_4$ by hydrazine at ambient temperature.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiMn_2O_4$ (74.41 g, 4 12 millimoles), $Li_2CO_3$ (15.32 g, 206 mmoles), and deionized water (150 ml) were charged to the flask. Stirring was begun. A volumetric pipet was used to add $N_2H_4.H_2O$ (5.0 ml, 5.15 g, 103 mmoles). Except for brief periods, a counterflow of argon was maintained during these additions. There was no evidence of reaction. After about 50 minutes, $LiOH.H_2O$ (1.00 g, 24 mmoles) was added. Thereafter, slow gas evolution began. After about 40 hours of stirring at ambient temperature, the color of the suspension became olive drab.

The solid product was recovered by filtration in a Schlenk filter tube under an atmosphere of argon. The filter cake was washed on the frit with 100 ml of deionized water through which argon had been bubbled to remove oxygen. The superficially dry filter cake was dried in the filter tube under oil-pump vacuum. Thereafter it was transferred to a Schlenk tube; oil-pump vacuum and intermittent heating with a hot-air gun were used to dry the product further. A sample was removed for analysis by X-ray diffraction, which showed the product to contain approximately equal proportions of $Li_2Mn_2O_4$ and $LiMn_2O_4$, together with $Li_2CO_3$ and, possibly, a small amount of $Li_2MnO_3$.

EXAMPLE 11

Example 11 was similar to Example 10, except that the reaction mixture was heated to about 75° C.; reaction was more rapid, but by-product $Mn_3O_4$ was probably formed.

A 500 ml three-neck round-bottom flask was mounted on a ring stand in a hood. It was fitted with an overhead stirrer, a thermometer, a reflux condenser, and an argon inlet. The assembled apparatus was purged with argon, which was vented to the atmosphere through a mineral-oil filled check valve. $LiMn_2O_4$ (74.41 g, 412 millimoles), $Li_2CO_3$ (15.32 g, 206 mmoles), and deionized water (170 ml) were charged to the flask. Stirring was begun. A volumetric pipet was used to add $N_2H_4.H_2O$ (5.0 ml, 5.15 g, 103 mmoles). Except for brief periods, a counterflow of argon was maintained during these additions. Thereafter, heat was applied from an electric heating mantle. When temperature reached 75° C., gas evolution began. It stopped after about two hours. The suspended solids were brown.

The solid product was recovered by filtration in a Schlenk filter tube under an atmosphere of argon. The filter cake was washed on the frit with 100 ml of deionized water through which argon had been bubbled to remove oxygen. The superficially dry filter cake was dried in the filter tube under oil-pump vacuum. Thereafter it was transferred to a Schlenk tube; oil-pump vacuum and intermittent heating with a hot-air gun were used to dry the product further. A sample was removed for analysis by X-ray diffraction, which showed the product to contain approximately equal proportions of $Li_2Mn_2O_4$ and $LiMn_2O_4$, together with $Li_2CO_3$ and, possibly, a small amount of $Li_2MnO_3$.

EXAMPLE 12

Example 12 demonstrated that lithium borohydride was an effective reducing agent for the conversion of $LiMn_2O_4$ to $Li_2Mn_2O_4$ in an aqueous medium.

A 500-ml three-neck round-bottom flask was mounted on a supporting bar in a hood. It was fitted with an overhead stirrer, a reflux condenser, and an argon inlet. The assembled apparatus was purged with argon, which was vented to the atmosphere through a mineral oil filled check valve. $LiMn_2O_4$ (48.15 g, 266 mmole), $LiOH.H_2O$ (9.78 g, 233 mmole), and deionized water (150 ml) were charged to the reactor. Stirring was begun. Thereafter, $LiBH_4$ (0.76 g, 35 mmole) was added. After about one hour at ambient temperature, there was no evidence of reaction. Thereafter, an electric heating mantle was used to reflux the reaction mixture. After about four hours at reflux, the suspension had become somewhat brown. After an interval in which the reaction mixture was maintained at ambient temperature under an atmosphere of argon, additional $LiBH_4$ (0.59 g, 27 mmole) was added, and reflux was resumed for about an additional six hours. Thereafter, the green-brown suspension was cooled under an atmosphere of argon.

The solid product was recovered by filtration in a Schlenk filter tube under an atmosphere of argon. The wet filter cake was dried in the Schlenk filter tube; the tube was evacuated with an oil pump and heated with several turns of electrical heating tape. Thereafter, the filter tube was cooled, filled with argon, and taken into a dry box. In the dry box, the product was transferred to a glass jar. Subsequently, a small portion of this material was ground with 3-in-1™ oil and pressed into a plaque for XRD analysis. As judged by the relative heights of the principal peaks, the product contained about 40% $LiMn_2O_4$ and 60% $Li_2Mn_2O_4$. No other phases were prominent.

EXAMPLE 13

Example 13 demonstrated that sulfide ion, supplied as lithium sulfide, was an effective reducing agent for the conversion of $LiMn_2O_4$ to $Li_2Mn_2O_4$ in an aqueous medium.

A 500-ml three-neck round-bottom flask was mounted on a supporting bar in a hood. It was fitted with an overhead stirrer, an argon inlet, and an argon outlet. The assembled apparatus was purged with argon, which was vented to the atmosphere through a mineral oil filled check valve. $LiMn_2O_4$ (39.42 g, 218 mmole), $LiOH.H_2O$ (0.60 g, 14 mmole), and deionized water (100 ml) were charged to the reactor. $Li_2S$ (5.0 g, 109 mmole) was charged through a powder funnel; residues on the funnel were washed into the flask with an additional 50 ml of deionized water. Stirring was begun. Reaction began immediately; within about three minutes, the suspended solids had become yellow-brown. No gas was evolved. The reaction vessel warmed slightly. Stirring was continued for 1.5 hour.

The solid product was recovered by filtration in a Schlenk filter tube under an atmosphere of argon. The wet filter cake was dried in the Schlenk filter tube; the tube was evacuated with an oil pump and heated with several turns of electrical heating tape. Sulfur vaporized from the product. Most of the sulfur deposited as a ring of solid on a cold section of the tube. A smaller amount of sulfur deposited as drops of liquid on a warmer section of the tube wall that was closer to the heating tape. Thereafter, the filter tube was cooled, filled with argon, and taken into a dry box. The manganese-containing product was a free-flowing powder, which was easily poured into a glass jar. Essentially all of the sulfur remained on the wall of the tube. Karl-Fischer titration of the water evolved from the product at 335° C. found 1024 ppm water. Subsequently, a small portion of the product was ground with 3-in1™ oil and pressed into a plaque for XRD analysis. The XRD spectrum of the product was cleanly that of $Li_2Mn_2O_4$. Except for a few very small peaks consistent with the presence of elemental sulfur, no other phases were present.

EXAMPLE 14

Example 14 demonstrated that sulfide ion, supplied as lithium sulfide, was an effective reducing agent for the conversion of $LiMn_2O_4$ to $Li_2Mn_2O_4$ in a non-aqueous medium.

A 500-ml three-neck round-bottom flask, reflux condenser, and adapter joints were oven dried at 105° C. The round-bottom flask, overhead stirrer, reflux condenser, and argon inlet were assembled on a supporting bar in a hood. The assembled apparatus was purged with argon, which was vented to the atmosphere through a mineral oil filled check valve. $LiMn_2O_4$ (39.42 g, 218 mmole), $Li_2S$ (5.0 g, 109 mmole), and 1,2-diethoxyethane (150 ml) were charged to the reactor. Stirring was begun. An electric heating mantle was used to warm the reaction mixture. Before the mixture reached reflux, the suspended solids had become yellow-brown. The mixture was refluxed for about 0.5 hour.

The solid product was recovered by filtration in an oven-dried Schlenk filter tube under an atmosphere of argon. The wet filter cake was dried in the Schlenk filter tube; the tube was evacuated with an oil pump and heated with several turns of electrical heating tape. Sulfur vaporized from the product. Most of the sulfur deposited as a ring of solid on a cold section of the tube. A smaller amount of sulfur deposited as drops of liquid on a warmer section of the tube wall that was closer to the heating tape. Thereafter, the filter tube was cooled, filled with argon, and taken into a dry box. The manganese-containing product was a free-flowing powder, which was easily poured into a glass jar. Essentially all of the sulfur remained on the wall of the tube. Karl-Fischer titration of the water evolved from the product at about 335° C. found 606 ppm water. Subsequently a small portion of the product was ground with 3-in-1™ oil and pressed into a plaque for XRD analysis. The XRD spectrum of the product was an excellent match to that of $Li_2Mn_2O_4$. The spectrum contained one small peak that was consistent with the presence of a small amount of MnS.

EXAMPLE 15

Example 15 demonstrated that elemental sulfur was an effective catalyst for the reduction of $LiMn_2O_4$ to $Li_2Mn_2O_4$ by lithium in a non-aqueous medium.

A 500-ml three-neck round-bottom flask, reflux condenser, and adapter joints were oven dried at 105° C. The round-bottom flask, overhead stirrer, reflux condenser, and argon inlet were assembled on a supporting bar in a hood. The assembled apparatus was purged with argon, which was vented to the atmosphere through a mineral oil filled check valve. $LiMn_2O_4$ (45.20 g, 250 mmole), Li (1.73 g, 250 mmole), S (0.80 g, 25 mmole), and 1,2-diethoxyethane (150 ml) were charged to the reactor. Stirring was begun. An electric heating mantle was used to warm the reaction mixture to reflux. Within about 3 hours, the suspended solids had become yellow-brown. Thereafter, the mixture was refluxed for an additional 4 hours.

The solid product was recovered by filtration in an oven-dried Schlenk filter tube under an atmosphere of argon. The color and odor of the filtrate suggested that the solvent was involved in side reactions. Many lumps of organic-coated lithium were separated mechanically from the product. The wet filter cake was dried in the Schlenk filter tube; the tube was evacuated with an oil pump and heated with several turns of electrical heating tape. A small amount of sulfur vaporized from the product. Thereafter, the filter tube was cooled, filled with argon, and taken into a dry box. The product was transferred to a glass jar. Subsequently, a small portion of the product was ground with 3-in-1™ oil and pressed into a plaque for XRD analysis. As judged by the relative heights of the principal peaks, the product contained about 25% $LiMn_2O_4$ and 75% $Li_2Mn_2O_4$. No other phases were evident.

EXAMPLE 16

Example 16 demonstrated that elemental iodine was an effective catalyst for the reduction of $LiMn_2O_4$ to $Li_2Mn_2O_4$ by lithium in a non-aqueous medium.

A 500-ml three-neck round-bottom flask was mounted on a supporting bar in a hood. It was fitted with an overhead stirrer, a reflux condenser, and an argon inlet. The assembled apparatus was purged with argon, which was vented to the atmosphere through a mineral oil filled check valve. $LiMn_2O_4$ (45.08 g, 250 mmole), Li (1.73 g, 250 mmole), LiI (1.0 g, 7.5 mmole), and 1,2-diethoxyethane (150 ml) were charged to the reactor. The mixture was stirred briefly and then allowed to settle. The supernatant solution was red-brown, consistent with the facile generation of I2. Thereafter, stirring was resumed, and an electric heating mantle was used to warm the reaction mixture to reflux. After about 20 hours at reflux, the suspension had become yellow-brown. Thereafter, the mixture was refluxed for an additional 6 hours.

The solid product was recovered by filtration in an oven-dried Schlenk filter tube under an atmosphere of argon. Many very small pieces of lithium were visible. The wet filter cake was dried in the Schlenk filter tube; the tube was evacuated with an oil pump and heated with several turns of electrical heating tape. Thereafter, the filter tube was cooled, filled with argon, and taken into a dry box. The product was transferred to a glass jar. Subsequently, a small portion of the product was ground with 3-in-1™ oil and pressed into a plaque for XRD analysis. The XRD spectrum of the product was cleanly that of $Li_2Mn_2O_4$.

EXAMPLE 17

Example 17 demonstrated that hydrogen sulfide and lithium carbonate were effective for the reduction of $LiMn_2O_4$ to $Li_2Mn_2O_4$ in an aqueous medium. By-products are observed.

A 250-ml three-neck round-bottom flask was mounted on a supporting bar in a hood to serve as an $H_2S$-gas generator. It was fitted with a magnetic stirrer bar, a pressure-equalizing dropping funnel, an argon-inlet tube, and a gas-outlet tube. FeS (6.0 grams, 68 mmole) and 50 ml of deionized water were charged to the flask; stirring was begun. Concentrated $H_2SO_4$ (10 ml) was charged to the dropping funnel.

A 500-ml three-neck round-bottom flask was mounted on a supporting bar in a hood. It was fitted with an overhead stirrer, a dip tube for introduction of gas below the solvent surface, and a gas outlet. The reaction flask was vented to the hood through a mineral oil filled check valve. The dip tube in the reaction flask was connected to the gas outlet from the $H_2S$ generator by a short length of rubber tubing. The assembled apparatus was purged with argon. $LiMn_2O_4$ (20.00 g, 111 mmole), $Li_2CO_3$ (4.09 g, 55 mmole), and deionized water (200 ml) were charged to the reactor. Stirring of the reaction flask was begun. Thereafter, the concentrated $H_2SO_4$ was added to the $H_2S$-gas generator over about 2 hours; slowly flowing argon was used to carry the evolved $H_2S$ into the reaction flask. When $H_2S$ evolution ceased, conversion of $LiMn_2O_4$ to $Li_2Mn_2O_4$ remained incomplete, as judged by the color change. Additional FeS (5 gram, 57 mmole) was charged to the $H_2S$ generator; $H_2S$ evolution resumed. Over an additional 2 hours, slowly flowing argon was again used to carry the $H_2S$ into the reaction flask. Thereafter, the suspended solids had become yellow-brown.

The solid product was recovered by filtration in a Schlenk filter tube under an atmosphere of argon. The wet filter cake was dried in the Schlenk filter tube; the tube was evacuated with an oil pump and heated with several turns of electrical heating tape. Sulfur vaporized from the product. Most of the sulfur deposited as a ring of solid on a cold section of the tube. Thereafter, the filter tube was cooled, filled with argon, and taken into a dry box. The red-brown product was a flee-flowing powder, which was easily poured into a glass jar. Essentially all of the sulfur remained on the wall of the tube. Subsequently, a small portion of the product was ground with 3-in-1™ oil and pressed into a plaque for XRD analysis. The XRD spectrum of the product was consistent with the presence of $Li_2Mn_2O_4$, $Mn_3O_4$, and $Li_2CO_3$. Small peaks attributable to MnS and $Li_2MnO_3$ were present also.

EXAMPLE 18

Example 18 demonstrated that hydrogen sulfide and lithium hydroxide were effective for the reduction of $LiMn_2O_4$ to $Li_2Mn_2O_4$ in an aqueous medium. By-products were observed.

A 500-ml three-neck round-bottom flask was mounted on a supporting bar in a hood. It was fitted with an overhead stirrer, a dip tube for introduction of gas below the solvent surface, and a gas outlet. The reaction flask was vented to the hood through a mineral oil filled check valve. The dip tube in the reaction flask was connected to an $H_2S$ cylinder by a short length of rubber tubing. The assembled apparatus was purged with argon. $LiMn_2O_4$ (30.00 g, 166 mmole), $LiOH.H_2O$ (6.96 g, 166 mmole), and deionized water (200 ml) were charged to the reactor. Stirring of the reaction flask was begun. About 9.1 g (240 mmoles) of $H_2S$ was added over about 2 hours. Thereafter, the suspended solids had become yellow-brown.

The solid product was recovered by filtration in a Schlenk filter tube under an atmosphere of argon. The wet filter cake was dried in the Schlenk filter tube; the tube was evacuated with an oil pump and heated with several turns of electrical heating tape. Sulfur vaporized from the product. Most of the sulfur deposited as a ring of solid on a cold section of the tube. Thereafter, the filter tube was cooled, filled with argon, and taken into a dry box. The red-brown product was a free-flowing powder, which was easily poured into a glass jar. Essentially all of the sulfur remained on the wall of the tube. Subsequently, a small portion of the product was ground with 3-in-1™ oil and pressed into a plaque for XRD analysis. The XRD spectrum of the product was consistent with the presence of $Li_2Mn_2O_4$, and smaller amounts of $Mn_3O_4$ and MnO.

What is claimed is:

1. A method for manufacturing $Li_2Mn_2O_4$ comprising the steps of:
   (a) Providing $LiMn_2O_4$;
   (b) Providing a lithium salt selected from the group consisting of LiOH and $Li_2CO_3$:
   (c) Forming a solution or suspension of the $LiMn_2O_4$ and lithium salt in a liquid medium; and
   (d) Adding a reducing agent to the solution or suspension.

2. The method of claim 1 wherein the lithium salt is LiOH.

3. The method of claim 1 wherein the lithium salt is $Li_2Co_3$.

4. A method for manufacturing $Li_2Mn_2O_4$ comprising the steps of:
   (a) Providing $LiMn_2O_4$;
   (b) Providing $Li_2S$;
   (c) Forming a solution or suspension of the $LiMn_2O_4$ and $Li_2S$ in a liquid medium; and
   (d) Adding $Li_2S$ to the solution or suspension.

5. The method of claim 1 wherein the reducing agent is selected from the group consisting of hydrazine, hydrazine sulfate, hydroxylamine hydrochloride, lithium borohydride, lithium sulfide, ammonium sulfide and hydrogen sulfide.

6. The method of claim 1 wherein the liquid medium is selected from the group consisting of water and lower alkyl alcohols.

7. The method of claim 6 wherein the liquid medium is water.

8. The method of claim 6 wherein the liquid medium is methanol.

9. The method of claim 1 wherein the reaction between the reducing agent and the solution or suspension of $LiMn_2O_4$ and lithium salt is carried out at a pH greater than about 7.

10. The method of claim 1 wherein the lithium salt is in an aqueous form prior to the solution or suspension with $LiMn_2O_4$ being formed.

11. The method of claim 1 wherein the reducing agent is in an aqueous form prior to adding to the solution or suspension.

12. The method of claim 1 wherein the reaction between the solution or suspension of $LiMn_2O_4$ and lithium salt and the reducing agent takes less than about 240 minutes to complete.

13. The method of claim 12 wherein the reaction takes from about 5 minutes to about 240 minutes to complete.

14. The method of claim 1 wherein the reducing agent of step (d) is soluble in the solution or suspension.

15. The method of claim 1 wherein the reaction between the reducing agent and the solution or suspension of $LiMn_2O_4$ and lithium salt is carried out at a temperature of less than about 100° C. at ambient pressure.

16. The method of claim 1 wherein the reaction is carried out at a temperature of from about −45° C. to about 200° C. at a pressure of less than about 200 psi.

\* \* \* \* \*

UNITED STATES PATENT AND TRADEMARK OFFICE
CERTIFICATE OF CORRECTION

PATENT NO. : 5,597,664
DATED : January 28, 1997
INVENTOR(S) : Paul C. Ellgen

It is certified that error appears in the above-indentified patent and that said Letters Patent is hereby corrected as shown below:

Column 5, line 56, insert --$Li_2Mn_2O_4$-- between "gives" and "purities"

Column 14, line 37, delete "12" and insert --$I_2$--

Signed and Sealed this

Seventh Day of October, 1997

Attest:

BRUCE LEHMAN

Attesting Officer

Commissioner of Patents and Trademarks